(12) United States Patent
Otsuki et al.

(10) Patent No.: US 12,039,485 B2
(45) Date of Patent: Jul. 16, 2024

(54) HOME DELIVERY SYSTEM, MOVING BODY, AND HOME DELIVERY METHOD

(71) Applicant: TOYOTA JIDOSHA KABUSHIKI KAISHA, Toyota (JP)

(72) Inventors: Nobuhisa Otsuki, Toyota (JP); Haeyeon Lee, Tokyo-to (JP); Kunihiro Iwamoto, Nagakute (JP); Yuta Itozawa, Nagoya (JP); Hirotaka Komura, Tokyo-to (JP); Yutaro Takagi, Tokyo-to (JP); Kota Oishi, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/742,933

(22) Filed: May 12, 2022

(65) Prior Publication Data
US 2022/0391834 A1    Dec. 8, 2022

(30) Foreign Application Priority Data
Jun. 7, 2021    (JP) ................................. 2021-095381

(51) Int. Cl.
*G06Q 10/0833*    (2023.01)
*G06Q 10/0631*    (2023.01)
(Continued)

(52) U.S. Cl.
CPC . *G06Q 10/0833* (2013.01); *G06Q 10/063116* (2013.01); *G06Q 10/0832* (2013.01); *G06Q 10/08355* (2013.01); *G06Q 10/0838* (2013.01)

(58) Field of Classification Search
CPC ............ G06Q 10/083; G06Q 10/0833; G06Q 10/0832; G06Q 10/08355; G06Q 10/0838
See application file for complete search history.

(56) References Cited

U.S. PATENT DOCUMENTS

2015/0154850 A1*  6/2015  Fadell ................. G06Q 10/083
                                                       340/501
2015/0237228 A1*  8/2015  Okuzono ........... H04N 1/00896
                                                       358/1.13
(Continued)

FOREIGN PATENT DOCUMENTS

JP    2018-181291 A    11/2018
JP    2020-086754 A     6/2020
(Continued)

OTHER PUBLICATIONS

Chu, Jennifer, "Technique helps robots find the front door," MIT News, Nov. 4, 2019, Retrieved from https://news.mit.edu/2019/technique-helps-robots-find-front-door-1104 (Year: 2019).*

*Primary Examiner* — Rupangini Singh
*Assistant Examiner* — Bryan J Kirk
(74) *Attorney, Agent, or Firm* — Sughrue Mion, PLLC

(57) ABSTRACT

A home delivery system delivering objects to a residence comprises a moving body configured to move autonomously or remotely, a plurality of sensors placed in the residence, and the processing apparatus. The processing apparatus is configured to execute observing status of a resident including whether or not the resident is in the residence based on detection information acquired from the plurality of sensors. Then, the processing apparatus is configured to execute instructing the moving body to start a delivery at least condition that the resident is in the residence and instructing the moving body to complete the delivery on condition that the resident is available to response after the moving body arriving at the residence.

10 Claims, 9 Drawing Sheets

(51) Int. Cl.
*G06Q 10/083* (2024.01)
*G06Q 10/0832* (2023.01)
*G06Q 10/0835* (2023.01)

(56) References Cited

U.S. PATENT DOCUMENTS

| | | | |
|---|---|---|---|
| 2016/0068264 A1* | 3/2016 | Ganesh | G05D 1/042 |
| | | | 701/4 |
| 2017/0011340 A1* | 1/2017 | Gabbai | G08G 5/0034 |
| 2018/0174102 A1* | 6/2018 | Winkle | G06Q 10/08355 |
| 2019/0056751 A1* | 2/2019 | Ferguson | H04W 4/40 |
| 2019/0122322 A1* | 4/2019 | Perez | G06F 16/23 |
| 2021/0406822 A1 | 12/2021 | Nakai | |

FOREIGN PATENT DOCUMENTS

| | | |
|---|---|---|
| JP | 2021-2267 A | 1/2021 |
| JP | 2021-33581 A | 3/2021 |

* cited by examiner

HOME DELIVERY SYSTEM, MOVING BODY, AND HOME DELIVERY METHOD

CROSS-REFERENCE TO RELATED APPLICATION

The present disclosure claims priority under 35 U.S.C. § 119 to Japanese Patent Application No. 2021-095381, filed on Jun. 7, 2021, which is incorporated herein by reference in its entirety.

BACKGROUND

Technical Field

The present disclosure relates to a home delivery system delivering a goods to a residence. The present disclosure also relates to a moving body delivering a goods to a residence autonomously or remotely. Furthermore, the present disclosure also relates to a home delivery method delivering a goods to a residence by a moving body configured to move autonomously or remotely.

Background Art

Patent Literature 1 discloses a processing apparatus, a processing system, processing method, and a program for realizing an efficient delivery of goods. These are configured to execute calculating a probability about whether a resident is in the residence at the time of a delivery based on analysis data of the situation of the surrounding of the residence, the delivery result data, and the like. And these are configured to execute deciding a delivery process or a delivery route according to the probability.

LIST OF RELATED ART

Patent Literature 1: Japanese Laid-Open Patent Application Publication No. JP-2020-086754

SUMMARY

In Patent Literature 1 discloses the technique calculating the probability about whether the resident is in the residence. However, depending on a status of the resident, even if the resident is in the residence when the delivery is performed, the resident may not be unable to respond or may feel sense of annoyance. An object of the present disclosure is, in view of the above problems, to provide a technique that can reduce that the resident is unable to respond and reduce sense of annoyance of the resident to receive.

A first disclosure is directed to a home delivery system delivering objects to a residence.

The home delivery system according to the first disclosure comprises:
  a moving body configured to move autonomously or remotely;
  a plurality of sensors placed in the residence; and
  a processing apparatus.
The processing apparatus is configured to execute:
  acquiring detection information from the plurality of sensors;
  observing status of a resident including whether or not the resident is in the residence based on the detection information;
  instructing the moving body to start a delivery at least on condition that the resident is in the residence;
  instructing the moving body to complete the delivery on condition that the resident is available to response after the moving body arriving at the residence.

A second disclosure is directed to a home delivery system further including the following features with respect to the home delivery system according to the first disclosure.
  The processing apparatus is further configured to execute:
  receiving an input of a setting for determining the detection information to be acquired; and
  storing the setting in a memory.
  The acquiring the detection information includes acquiring the detection information according to the setting.

A third disclosure is directed to a home delivery system further including the following features with respect to the home delivery system according to the first disclosure.
  The processing apparatus is further configured to execute receiving a designation of a receiver for the objects.
  The observing the status of the resident includes observing a status of the receiver.

A fourth disclosure is directed to a home delivery system further including the following features with respect to the home delivery system according to the first disclosure.
  The processing apparatus is further configured to execute storing in a memory:
    a first category of the status of the resident, indicating the resident being unable to respond for a while; and
    a second category of the status of the resident, indicating the resident being unable to respond immediately.
  The instructing the moving body to start the delivery includes instructing the moving body to start the delivery when the resident is in the residence and the status of the resident is not fall into the first category.
  The instructing the moving body to complete the delivery includes instructing the moving body to complete the delivery when the resident is in the residence and the status of the resident is not fall into the first category or the second category.

A fifth disclosure is directed to a home delivery system further including the following features with respect to the home delivery system according to the fourth disclosure.
  The processing apparatus is further configured to execute receiving an input of changing either or both of the first category and the second category.

A sixth disclosure is directed to a home delivery system further including the following features with respect to the home delivery system according to the fourth disclosure.
  The instructing the moving body to start the delivery includes temporarily shrinking a range of the first category when instructing the moving body to start the delivery is not executed for a predetermined period. Or the instructing the moving body to complete the delivery includes temporarily shrinking a range of the first category or the second category when instructing the moving body to complete the delivery is not executed for a predetermined period.

A seventh disclosure is directed to a moving body delivering objects to a residence autonomously or remotely.
  The moving body according to the seventh disclosure comprises a processing apparatus.
  The processing apparatus is configured to execute:
    acquiring detection information from a plurality of sensors placed in the residence;
    observing status of a resident including whether or not the resident is in the residence based on the detection information;
    deciding to start a delivery at least on condition that the resident is in the residence;

deciding to complete the delivery on condition that the resident is available to response after the moving body arriving at the residence.

An eighth disclosure is directed to a moving body further including the following features with respect to the moving body according to the seventh disclosure.

The processing apparatus is further configured to:
receiving an input of a setting for determining the detection information to be acquired; and
storing the setting in a memory.

The acquiring the detection information includes acquiring the detection information according to the setting.

A ninth disclosure is directed to a moving body further including the following features with respect to the moving body according to the seventh disclosure.

The processing apparatus is further configured to execute receiving a designation of a receiver for the objects.

The observing the status of the resident includes observing a status of the receiver.

A tenth disclosure is directed to a moving body further including the following features with respect to the moving body according to the seventh disclosure.

The processing apparatus is further configured to execute storing in a memory:
a first category of the status of the resident, indicating the resident being unable to respond for a while; and
a second category of the status of the resident, indicating the resident being unable to respond immediately.

The deciding to start the delivery includes deciding to start the delivery when the resident is in the residence and the status of the resident is not fall into the first category.

The deciding to complete the delivery includes deciding to complete the delivery when the resident is in the residence and the status of the resident is not fall into either the first category or the second category.

An eleventh disclosure is directed to a moving body further including the following features with respect to the moving body according to the tenth disclosure.

The processing apparatus is further configured to execute receiving an input of changing either or both of the first category and the second category.

A twelfth disclosure is directed to a moving body further including the following features with respect to the moving body according to tenth disclosure.

The deciding to start the delivery includes temporarily shrinking a range of the first category when deciding to start the delivery is not executed for a predetermined period.

The deciding to complete the delivery includes temporarily shrinking a range of the first category or the second category when deciding to complete the delivery is not executed for a predetermined period.

A thirteenth disclosure is directed to a home delivery method delivering objects to a residence by a moving body configured to move autonomously or remotely.

The home delivery method according to the thirteenth disclosure comprises:
acquiring detection information form a plurality of sensors placed in the residence;
observing status of a resident including whether or not the resident is in the residence based on the detection information;
deciding to start a delivery at least on condition that the resident is in the residence;
having the moving body move to the residence;
deciding to complete the delivery on condition that the resident is available to response after the moving body arriving at the residence.

A fourteenth disclosure is directed to a home delivery method further including the following features with respect to the home delivery method according to the thirteenth disclosure.

When a receiver for the objects is designated, the observing the status of the resident includes observing a status of the receiver.

A fifteenth disclosure is directed to a home delivery method further including the following features with respect to the home delivery method according to the thirteenth disclosure. Here, a first category is a category of the status of the resident, indicating the resident being unable to respond for a while. And a second category is a category of the status of the resident, indicating the resident being unable to respond immediately.

The deciding to start the delivery includes deciding to start the delivery when the resident is in the residence and the status of the resident is not fall into the first category.

The deciding to complete the delivery includes deciding to complete the delivery when the resident is in the residence and the status of the resident is not fall into either the first category or the second category.

According to the present disclosure, starting a delivery and completing the delivery is performed based on a status of a resident of a residence which is the delivery destination. It is thus possible to reduce that the resident is unable to respond when objects are delivered and reduce sense of annoyance of resident to receive objects.

EMBODIMENTS

Hereinafter, embodiments of the present disclosure will be described with reference to the accompanying drawings. Note that when the numerals of numbers, quantities, amounts, ranges and the like of respective elements are mentioned in the embodiment shown as follows, the present disclosure is not limited to the mentioned numerals unless specially explicitly described otherwise, or unless the disclosure is explicitly specified by the numerals theoretically. Furthermore, configurations that are described in the embodiment shown as follows are not always indispensable to the disclosure unless specially explicitly shown otherwise, or unless the disclosure is explicitly specified by the structures or the steps theoretically.

1. First Embodiment 1-1. Home Delivery System

Figure 1:
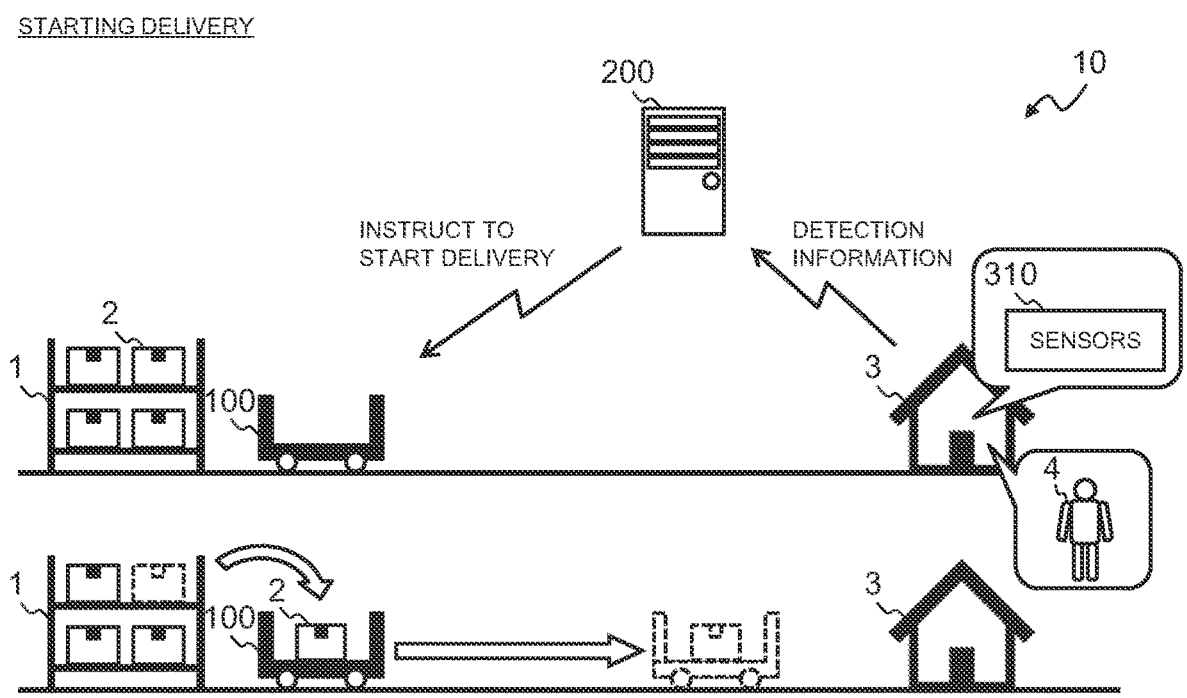
FIG. 1 is a conceptual diagram for explaining an outline of a home delivery service when starting a delivery is performed provided by a home delivery system according to an embodiment of the present disclosure.
Figure 2:
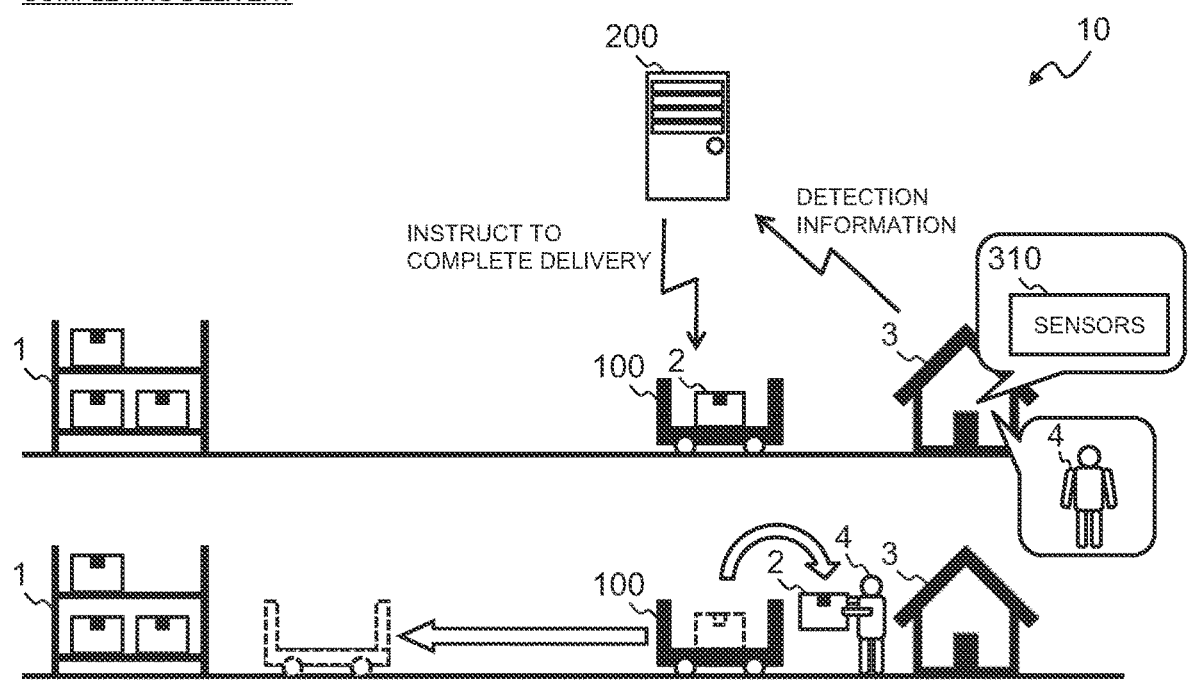
FIG. 2 is a conceptual diagram for explaining an outline of the home delivery service when completing the delivery is performed provided by the home delivery system according to an embodiment of the present disclosure.

FIG. 1 and FIG. 2 are a conceptual diagram for explaining an outline of a home delivery service provided by a home delivery system 10. The home delivery system 10 comprises a moving body 100 configured to move autonomously or remotely, a server 200, and a plurality of sensors 310 placed in a residence 3. In the home delivery service provided by the home delivery system 10, delivering objects 2 which is subject to delivery is performed by the moving body 10 moving autonomously or remotely. FIG. 1 and FIG. 2 show a case in which objects 2 are delivered to the residence 3. Here, FIG. 1 show a case when starting a delivery by the home delivery system 10, and FIG. 2 show a case when completing the delivery by the home delivery system 10.

The moving body 100 is, for example, a motor vehicle comprising a portion capable of storing objects 2. The server 200 is configured to be able to communicate information with the moving body 100 each other. And the server 200 is configured to be able to acquire detection information from the plurality of sensors 310.

In case the moving body 100 moves remotely, the moving body 100 acquires information of operation by communication and moves according to the information of operation. For example, the moving body 100 acquires the information of operation from the server 200. The configuration for acquiring the information of operation may employ an appropriate known technique. Furthermore, the moving body 100 may be configured to receive manual operation for some functions by an operator in a remote area.

First, referring to FIG. 1, the starting the delivery by the home delivery system 10 will be described. The moving body 100 does not start the delivery until the server 200 instructs the moving body 100 to start the delivery. Typically, the moving body 100 stands by at a predetermined standby location. The standby location is, for example, a parking lot provided for the moving body 100 to park, a predetermined location designated by the person who owns the moving body 100, and the like. Alternatively, the moving body 100 stands by near a loading location 1 where the objects 2 are present or are handed over to the moving body 100. The loading location 1 is, for example, a location where a plurality of objects scheduled for delivery to surrounding residences are being collected and stored. Or the loading location 1 may be a location where delivery products are provided.

The plurality of sensors 310 detects a situation about a resident 4 in the residence 3. For example, the plurality of sensors 310 gets information about motion of the resident 4, a position of the resident 4 in the residence 3, biological information of the resident 4, an image of a specific point in the residence 3, and the like. It will be described in detail later. The server 200 is configured to execute acquiring detection information from the plurality of sensors 310 and observation a status of the resident 4 directly or indirectly based on the detection information. The status of the resident 4 is, for example, sleeping, making a call, bathing, and the like. Here the status of the resident 4 at least includes whether or not the resident 4 is in the residence 3.

The server 200 is configured to execute instructing the moving body 100 to start the delivery at least on condition that the resident 4 is in the residence 3 by confirming the status of the resident 4. The server 200 may be configured to execute instructing the moving body 100 to start the delivery on condition that the status of the resident 4 does not indicate that the resident 4 being unable to respond for a while.

When the moving body 100 is instructed to start the delivery by the server 200, the moving body 100 stores the objects 2 subject to the delivery and starts the delivery. Here the storing the objects 2 may be performed by a function implemented in the moving body 100 (e.g., a robotic arm), or may be performed manually by a person. Alternatively, the objects 2 may be stored in the moving body 100 in advance. Then, the moving body 100 moves toward the residence 3 autonomously or remotely.

Next, referring to FIG. 2, the completing the delivery by the home delivery system 10 will be described. The moving body 100 does not complete the delivery until the server 200 instructs the moving body 100 to complete the delivery. Typically, the moving body 100 stands by in the vicinity of the residence 3.

The server 200 is configured to execute instructing the moving body 100 to complete the delivery on condition that the resident 4 is available to response by confirming the status of the resident 4 after the moving body 100 arriving at the residence 3.

When the moving body 100 is instructed to complete the delivery by the server 200, the moving body 100 calls the resident 4 and hands over the objects 2 to resident 4. Here the calling the resident 4 may be performed by a notification to a device installed in the residence 3 or a user device the resident 4 possesses (e.g., a mobile device with a specified application installed) through a communication network. In this case, the moving body 100 may be configured to perform the notification to these devices directly, or may be configured to instruct the server 200 to perform the notification. The handing over the objects 2 to the resident 4 may be performed by a function implemented in the moving body 100 (e.g., a robotic arm), or may be performed manually by the resident 4.

After the moving body 100 hands over the objects 2 to the resident 4, the moving body 100 moves to a predetermined location autonomously or remotely and then the process of completing the delivery of the objects 2 ends. Typically, the moving body 100 moves to the standby location and stands by until the server 200 instructs the moving body 100 to start another delivery.

During the moving body 100 performs the delivery, The server 200 may be configured to execute instructing the moving body 100 to cancel the delivery when the status of the resident 4 indicates that the resident 4 is not in the residence 3 or the resident 4 being unable to respond for a while. When the moving body 100 is instructed to cancel the delivery, the moving body 100 performs a process for cancelling the delivery according to the instruction by the server 200. For example, the moving body 100 moves to a predetermined location and stands by until the server 200 instructs the moving body 100 to restart the delivery. Alternatively, the moving body 100 stands by until the server 200 instructs the moving body 100 to start another delivery.

1-2. Monitoring Status of Resident

As described above, the plurality of sensors 310 detecting the situation about the resident 4 is placed in the residence 3. And the server 200 is configured to execute acquiring the detection information form the plurality of sensors 310 and monitoring the status of the resident 4 in the residence 3 based on the detection information.

Figure 3:
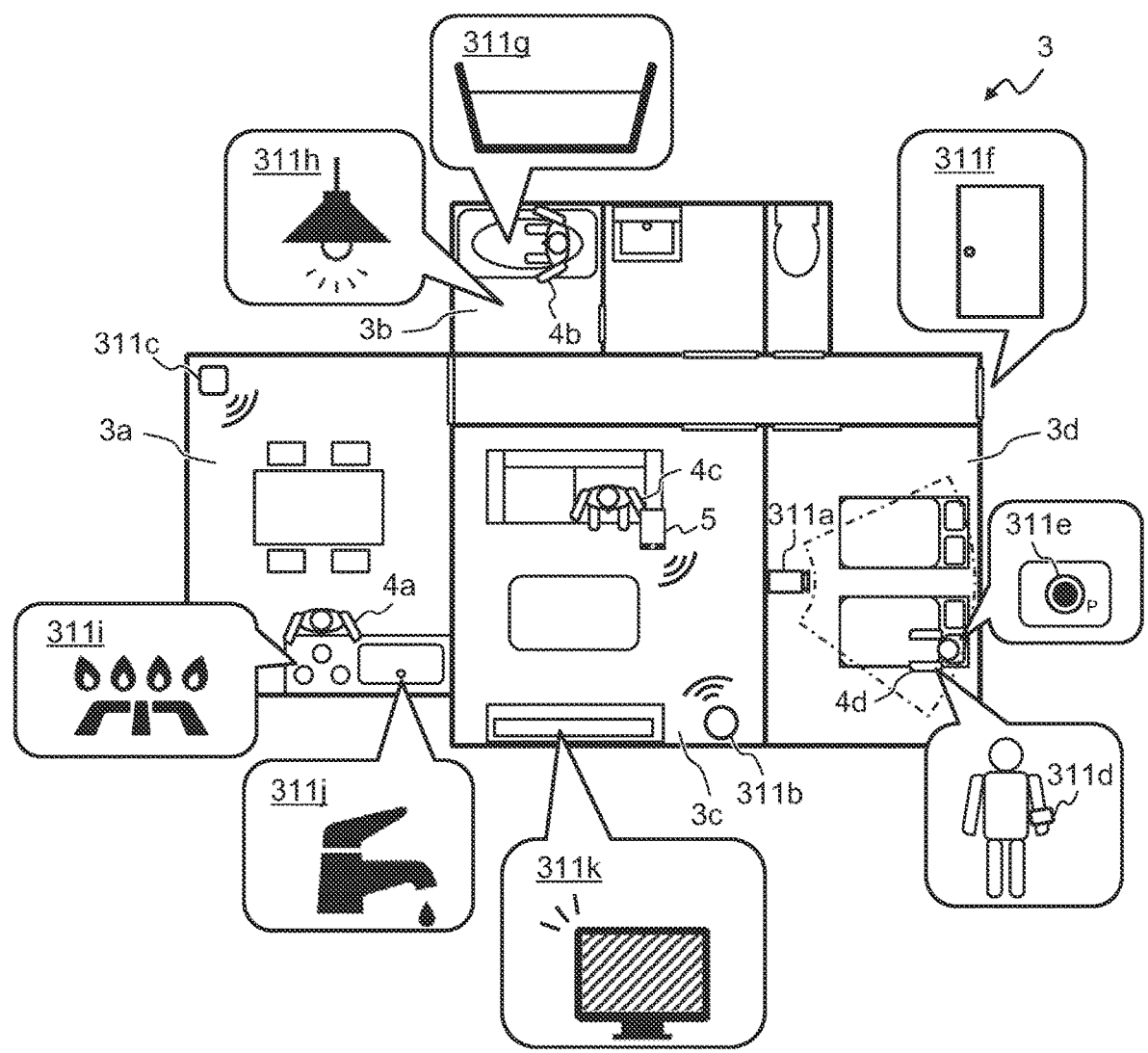
FIG. 3 is a conceptual diagram showing examples of a plurality of sensors placed in a residence and examples of a status of a resident.

FIG. 3 is a conceptual diagram showing examples of the plurality of sensors 310 in the residence 3 and examples of the status of the resident 4. In FIG. 3, the reference letter of each of the plurality of sensors 310 is added a symbol (a, b, c . . . ) to distinguish each of the plurality of sensors 310. Similarly, the reference letter of the resident 4 is added a symbol (a, b, c . . . ). In addition, some rooms of the residence 3 are given the reference letter (3a, 3b, 3c . . . ).

The sensor 311a is a sensor detecting the surrounding environment. The sensor 311a is, for example, a camera, a LiDAR (Light Detection And Ranging), and the like. The detection information outputted by the sensor 311a is, for example, an image of the imaging rage, a point cloud data of the detecting range, and the like. Furthermore, the sensor 311a may be configured to execute a process of data analysis (e.g., image analysis, point cloud analysis) and output information of an object in the image range or the detecting range as the detection information. In particular, the sensor 311a may be configured to output information of the resident 4 included in the image range or the detecting range as the detection information.

The sensor 311b is a sensor detecting a predetermined user device 5 in the vicinity of the sensor 311b. The sensor 311b is, for example, a wireless access point, an IR beacon, and the like. The user device 5 is, for example, a smartphone which the resident 4 possesses. The detection information outputted by the sensor 311b is, for example, information of whether the user device 5 exists in the vicinity of the sensor 311b, information of the position of the user device 5 in the room 3c, and the like.

The sensor 311c is a sensor which transmits a radio wave and detects the reflection or the attenuation of the radio wave. The sensor 311c is, for example, a device which transmits a radio wave for wireless communication. In this case, the sensor 311c may function as a device for transmitting and receiving information by wireless communication. The sensor 311c may be configured to execute a process of radio wave analysis and output information of an object in the vicinity of the sensor 311c as the detection information.

The sensor 311d is a sensor detecting biological information. The sensor 311d is, for example, a wearable device configured to be capable of detecting biological information of a worn user. The detection information outputted by the sensor 311d is, for example, body temperature, a heart rate, a pulse rate, blood pressure, posture, movement, and the like.

The sensor 311e is a sensor detecting a usage state of a pillow. The sensor 311e is, for example, a pressure sensor, a pressure switch, and the like. The detection information outputted by the sensor 311e is, for example, information whether the pillow is used, the pressure on the pillow, and the like.

The sensor 311f is a sensor detecting a status of a door. The sensor 311f is, for example, a door switch. The detection information outputted by the sensor 311f is, for example, information whether the door is open.

The sensor 311g is a sensor detecting a status of a bath. The sensor 311g is, for example, a water level sensor, a temperature sensor, and the like. The detection information outputted by the sensor 311g is, for example, an amount of water in the bath, temperature of water in the bath, and the like.

The sensor 311h is a sensor detecting a status of an illumination in the room 3b. The sensor 311h is, for example, an illuminance sensor. Alternatively, the sensor 311h may be a device which communicates with the illumination and acquires information of the status (e.g., on/off, brightness setting). The detection information outputted by the sensor 311h is, for example, on/off state of the illumination, brightness of the illumination, and the like.

The sensor 311i is a sensor detecting a status of a cooking stove. The sensor 311h is, for example, a temperature sensor, a flame detection sensor, a flow rate sensor, a gas pressure sensor, a current sensor, and the like. The detection information outputted by the sensor 311i is, for example, on/off state of the cooking stove, thermal power of the cooking stove, and the like.

The sensor 311j is a sensor detecting a status of a faucet. The sensor 311j is, for example, a flow rate sensor, a water pressure sensor, and the like. The detection information outputted by the sensor 311j is, for example, on/off state of the faucet, a flow rate, and the like.

The sensor 311k is a sensor detecting a status of a TV. The sensor 311k is, for example, a current sensor. Alternatively, the sensor 311k may be a device communicates with the TV and acquires information of the status (e.g., on/off, selected channel of the TV). The detection information outputted by the sensor 311k is, for example, on/off state of the TV, information of the selected channel, and the like.

As described above, the plurality of sensors 310 may include a variety of sensors 311. Furthermore, the plurality of sensors 310 may include a sensor different from the sensor 311 described above. For example, the plurality of sensors 310 may include a human detection sensor, a sensor detecting a status of a window, a sensor detecting consumption of energy (e.g., electric power, water, gas), a device which communicates with a plurality of facilities (e.g., air conditioning equipment, refrigerator, microwave oven, vacuum cleaner) and acquires information of these status, and the like. Incidentally, the plurality of sensors 310 may include multiple sensors of the same type placed at difference position respectively in the residence 3.

The server 200 acquires the detection information described above from the plurality of sensors 310 and monitors the status of the resident 4 directly or indirectly. Here, the server 200 may be configured to store time series data of the detection information in a memory and estimates the status of the resident 4 based on the time series data. The following describes examples of monitoring the status of the resident 4 by the server 200.

One example is about the resident 4a shown in FIG. 3. The server 200 can recognize that the cooking stove and the faucet is frequently used in the room 3a during a certain period based on the detection information (acquired from the sensor 311i and the sensor 311j) and the time series data of that. And the server 200 can recognize that the resident 4a is in the room 3a based on the detection information acquired from the sensor 311c. Then, the server 200 can determine that the status of the resident 4a is cooking in the room 3a.

Another example is about the resident 4b shown in FIG. 3. The server 200 can recognize changes in the amount of water in the bath based on the detection information acquired from the sensor 311g and the time series data of that. And the server 200 can recognize that the illumination in the room 3b is ON based on the detection information acquired from the sensor 311h. Then the server 200 can determine that the status of the resident 4b is bathing in the room 3b.

Another example is about the resident 4c shown in FIG. 3. The server 200 can recognize that the user device 5 the resident 4c possesses is in the room 3c based on the detection information acquired from the sensor 311b. And the server 200 can recognize that the TV is ON and selected into the channel which the resident 4c habitually watches based on the detection information acquired from the sensor 311k and the time series data of that. Then, the server 200 can determine that the status of the resident 4c is watching the TV.

Another example is about the resident 4d shown in FIG. 3. The server 200 can recognize that the resident 4d is in the room 3d based on the detection information acquired from the sensor 311a. And the server 200 can recognize that the pillow in the room 3d is used based on the detection information acquired from the sensor 311e. And the server 200 can recognize that the resident 4d is lying down in a resting state based on the detection information acquired from the sensor 311d. Then the server 200 can determine that the resident 4d is sleeping in the room 3d.

As another example, the server 200 can determine whether the resident 4 is in the residence 3 based on the detection information (acquired from the sensor 311f or a human detection sensor) and the time series data of that. The server 200 may be configured to determine the status of the resident 4 more diversely than described above based on different information and algorithms from those described above. For example, the server 200 may determine that the status of the resident 4 is in a bathroom, the status of the resident 4 is having a meal, and the like. Incidentally, the server 200 may use universal information (e.g., time, temperature, weather) when determining the status of the resident 4.

1-3. Configuration of Home Delivery System

Figure 4:
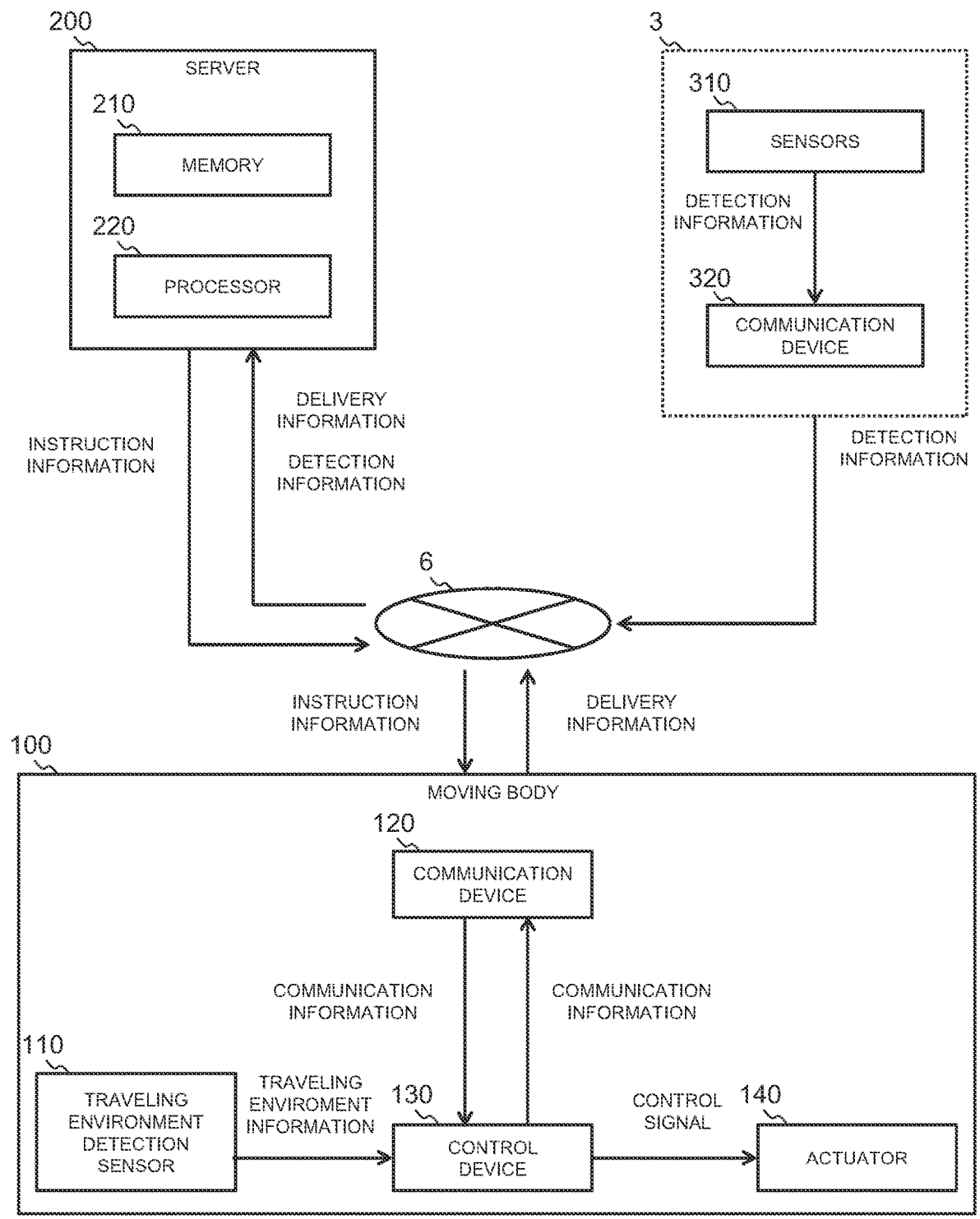
FIG. 4 is a block diagram for explaining a configuration of the home delivery system according to a first embodiment of the present disclosure.

The following describes a configuration of the home delivery system 10 according to the first embodiment. FIG. 4 is a block diagram for explaining the configuration of the home delivery system 10 according to the first embodiment.

The plurality of sensors 310 is, as described above, a class of the sensor 311 detecting a situation about the resident 4. The detection information outputted from the plurality of sensors 310 is transmitted to a communication device 320.

The communication device 320 is a device that transmits/receives information by connecting to a communication network 6. The communication network 6 is, for example, the internet. The communication device 320 is, for example, a device that acquires information by wireless communication with the plurality of sensors 310 and transmits/receives information by connecting the internet. The communication device 320 is typically placed in the residence 3. The communication device 320 acquires the detection information from the plurality of sensors 310 and transmits the detection information to the server 200 through the communication network 6.

The server 200 is a processing apparatus which includes a memory 210 and a processor 220. The server 200 is configured on the communication network 6. Here, the server 200 may be configured virtually. The memory 210 stores a program executable by the processor 220 and data (including information acquired by the server 200 and various information related to the program). Here, the memory 210 may store the time series data of information to be acquired for a certain period. The processor 220 reads the program and the data from the memory 210, and executes processes according to the program based on the data.

The processes executed by the server 200, more specifically, the processes executed by the processor 220 according to the program includes observing the status of the resident 4, instructing the moving body 100 to start the delivery, and instructing the moving body 100 to complete the delivery. Details of these processes will be described later.

The server 200 is configured to store a first category of the status of the resident 4 and a second category of the status of the resident 4 in the memory 210. Here, the first category indicates the resident 4 being unable to respond for a while, and the second category indicates the resident 4 being unable to respond immediately. Table. 1 shows an example of the first category and the second category stored in the memory 210. The first category and the second category may be stored as part of the program or as the data.

TABLE 1

| First Category | Second Category |
| --- | --- |
| bathing | in the bathroom |
| sleeping | making a call |
| watching favorite TV show | changing clothes |
| studying or working at a desk | brushing teeth |

The server 200 is configured to acquire delivery information from the moving body 100 through the communication network 6. Here, the delivery information is, for example, information about the delivery address, the status of the delivery (e.g., stand by for starting the delivery, during delivery, stand by for completing the delivery) and the like. And the server 200 is configured to observe the status of the resident 4 based on the detection information. And the server 200 is configured to confirm the status of the resident 4 according to the status of the delivery and generate an instruction information for instructing the moving body 100 to start the delivery, complete the delivery, or cancel the delivery. Then, the server 200 transmits the instruction information to the moving body 100.

The moving body 100 comprises a traveling environment detection sensor 110, a communication device 120, a control device 130, and an actuator 140.

The traveling environment detection sensor 110 is a class of sensor for detecting information of traveling environment. The traveling environment detection sensor 110 typically include a sensor for detecting the traveling status (e.g., speed, acceleration, yaw rate) of the moving body 100, and a sensor for detecting the surrounding environment (e.g., traveling path, pedestrian, obstacles) of the moving body 100. Examples of the sensor for detecting the traveling status include a wheel speed sensor, an accelerometer, a gyroscope, and the like. Examples of the sensor for detecting the surrounding environment include a camera, a millimeter-waver radar, a LiDAR, and the like. The traveling environment information outputted by the traveling environment detection sensor 110 is transmitted to the control device 130.

The communication device 120 is a device which transmits/receives information with external devices of the moving body 100 by connecting to the communication network 6. The communication device 120 is, for example, a device which connects to the internet through a base radio station and transmits/receives information by wireless communication. The communication device 120 is typically installed in the moving body 100. The communication information received by the communication device 120 includes at least the instruction information transmitted by the server 200.

And the communication information transmitted by the communication device 120 includes the delivery information.

The communication information received by the communication device 120 is transmitted to the control device 130. The communication information transmitted to the control device 130 includes at least the instruction information transmitted by the server 200.

The communication information received by the communication device 120 and the communication information transmitted to the control device 130 may include other information. Examples of that include map information and traffic information of the surrounding of the moving body 100, and the like.

The control device 130 is configured to execute various processes relating to the control of the moving body 100 based on information to be acquired, and output a control signal. Typically, the control device 130 is a processing apparatus which includes a memory and a processor. The control signal outputted by the control device 130 is transmitted to the actuator 140.

The processes executed by the control device 130 may include a process relating to autonomous traveling of the moving body 100. The process relating to autonomous traveling typically include setting a traveling plan to a destination (e.g., delivery address), and generating a traveling path based on the traveling environment information and map information. Then the control device 130 is configured to generate the control signal (relating to acceleration, braking, and steering) that have the moving body 100 travel according to the traveling path.

When the moving body 100 performs the delivery of the objects 2 according to the home delivery service, the control device 130 is configured to execute processes relating to autonomous traveling and other operations (e.g., storing the objects 2, handing over the objects 2) for having the moving body 100 perform starting the delivery, completing the delivery, or cancelling the delivery according to the instruction information transmitted from the communication device 120. Then, the control device 130 generates the control signal. And the control device 130 may be configured to transmit the delivery information as the communication information to the communication device 120.

Incidentally, the control device 130 may be a system composed of a plurality of processing apparatuses.

The actuator 140 operates in accordance with the control signal transmitted from the control device 130. Examples of the actuator 140 include an actuator driving drive wheels, an actuator driving a brake mechanism, an actuator driving a steering mechanism, an actuator driving a robot arm, and the like.

The server 200 may be configured to execute acquiring the detection information and observing the status of the resident 4 in the residence 3 when the residence 3 is specified based on the delivery information transmitted from the moving body 100.

The time series data of the detection information of each of the plurality of sensors 310 may be stored respectively in a memory of the sensor 310, a memory of the communication device 320, or a memory provided separately. And, when the server 200 executes observing the status of the resident 4, the detection information and the time series data of that may be transmitted to the server 200.

1-4. Process Executed by Server

Figure 5:
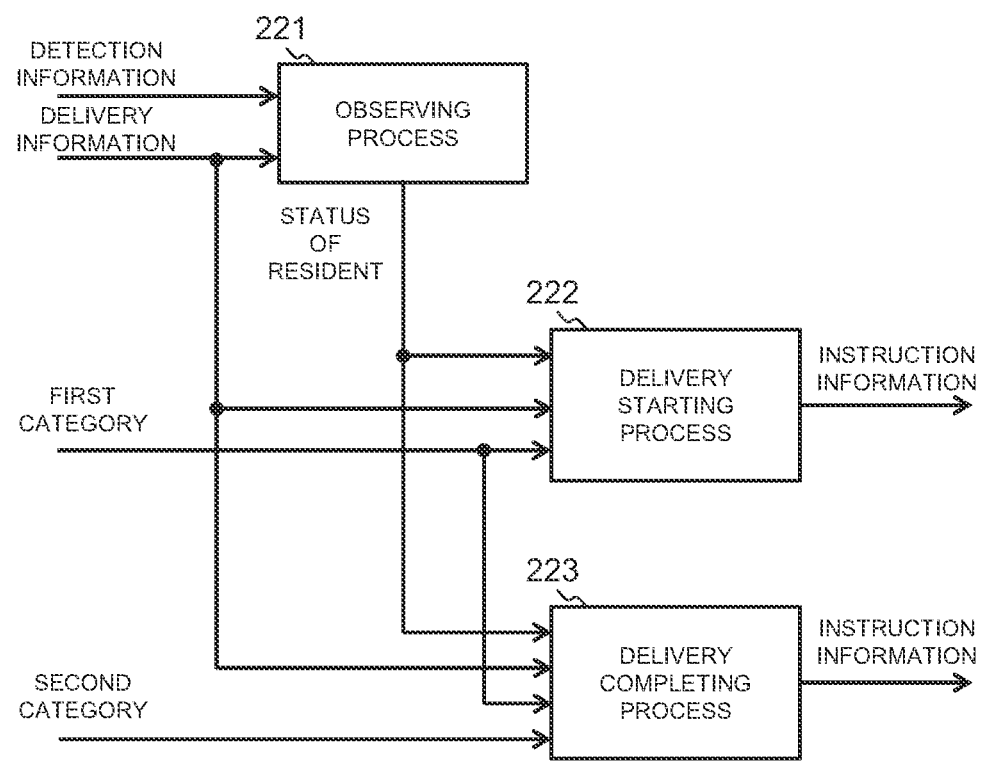
FIG. 5 is a block diagram for explaining a configuration of a process executed by a processing apparatus according to an embodiment of the present disclosure.

FIG. 5 is a block diagram for explaining a configuration of a process executed by the sever 200. The process executed by the server 200 includes an observing process 221, a delivery starting process 222, and a delivery completing process 223. Typically, these processes are realized by the program. Alternatively, these processes may be realized by a plurality of processing apparatuses. In this case, the server 200 represents a system composed of the plurality of processing apparatuses.

In the observing process 221, the server 200 executes observing the status of the resident 4 based on the detection information. The observing process 221 may be executed when the residence 3 is specified based on the delivery information. However, the observing process 221 may be executed continuously for the residence 3 to be specified. The method for determining the status of the resident 4 is as in the above examples. The status of the resident 4 observed by the observing process 221 is transmitted to the delivery starting process 222 and the delivery completing process 223.

In the delivery starting process 222, the server 200 executes generating the instruction information for instructing the moving body 100 to start the delivery by confirming the status of the resident 4 transmitted from the observing process 221. The delivery starting process 222 is executed when the delivery information shows that the moving body 100 stands by for starting the delivery. Then, in the delivery starting process 222, the server 200 executes reading the first category from the memory 210 and generating the instruction information for starting the delivery when the resident 4 is in the residence 3 and the status of the resident 4 is not fall into the first category.

Incidentally, if there are a plurality of residents in the residence 3, the server 200 may be configured to execute generating the instruction information for starting the delivery when the status of one of the plurality of residents is not fall into the first category.

In the delivery completing process 223, the server 200 executes generating the instruction information for instructing the moving body 100 to start the delivery or cancel the delivery by confirming the status of the resident 4 transmitted from the observing process 221. The delivery completing process 223 starts after the moving body 100 starts the delivery. And the delivery completing process 223 is executed during delivery. When the delivery information shows that the moving body 100 arrives at the residence 3 and stands by for completing the delivery, in the delivery completing process 223, the server 200 executes reading the first category and the second category from the memory 210. And the server 200 executes generating the instruction information for completing the delivery when the resident 4 is in the residence 3 and the status of the resident 4 is not fall into either the first category or the second category. On the other hand, during the delivery, in the delivery completing process 223, the server 200 executes reading the first category, and generating the instruction information for cancelling the delivery when the resident 4 is not in the residence 3 or the status of the resident 4 is fall into the first category.

Incidentally, if there are a plurality of residents in the residence 3, the server 200 may be configured to execute generating the instruction information for completing the delivery when the status of one of the plurality of residents is not fall into either the first category or the second category. And the server 200 may be configured to execute generating the instruction information for cancelling the delivery when all of the plurality of residents are not in the residence 3 or the status of all of the plurality of residents are fall into the first category.

The status of the resident 4 may be transmitted as particular data representing the status. For example, the status of "bathing", "sleeping", and "making a call" may be transmitted as character data of st1, st2, and st3 respectively. Similarly, the memory 210 may store the first category and the second category as particular data.

1-5. Home Delivery Method

Figure 6:
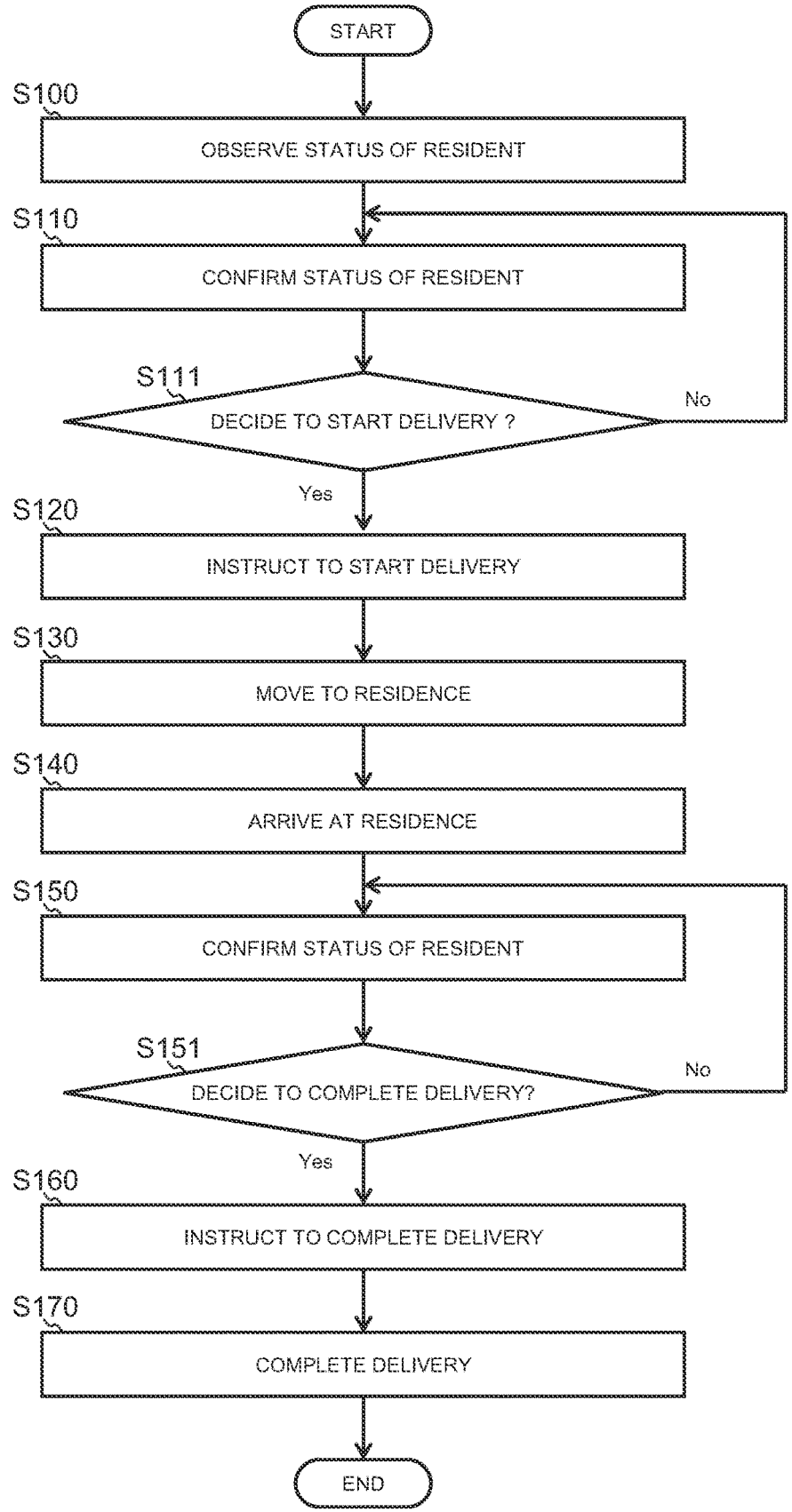
FIG. 6 is a flow chart showing a home delivery method realized by the home delivery system according to an embodiment of the present disclosure.

The following describes a home delivery method realized by the home delivery system 10 according to the first embodiment. FIG. 6 is a flow chart showing the home delivery method realized by the home delivery system 10. The flow chart shown in FIG. 6 typically starts when the moving body 100 transmits the delivery information for the objects 2 to the server 200.

In Step S100, the server 200 executes observing the status of the resident 4 in the residence 3 which is the delivery address of the objects 2.

After Step S100, the server 200 executes confirming the status of the resident 4 (Step S110) and deciding whether or not to start the delivery (Step S111). That is, determining whether or not the resident 4 is in the residence 3 and the status of the resident 4 is not fall into the first category. When deciding to start the delivery (Step S111; Yes), the processing proceeds to Step S120. When deciding not to start the delivery (Step S111; No), the processing returns back to Step S110.

In Step S120, the server 200 executes instructing the moving body 100 to start the delivery. Then, the processing proceeds to Step S130.

In Step S130, the moving body 100 receives the instruction information for starting the delivery from the server 200. And the moving body 100 starts to move towards the residence 3 autonomously or remotely. Then, after the moving body 100 arrives at the residence 3, the moving body 100 stands by for instruction by the server 200 (Step S140).

Incidentally, after Step S130, the server 200 may execute confirming the status of the resident 4 and deciding whether or not to cancel the delivery at predetermined intervals. That is, determining at predetermined intervals whether or not the resident 4 is not in the residence 3 or the status of the resident 4 is fall into the first category. When deciding to cancel the delivery, the server 200 executes instructing the moving body 100 to cancel the delivery. In this case, the processing of the flow chart shown in FIG. 6 is interrupted and terminated after the moving body 100 has performed cancelling the delivery. Alternatively, the processing returns back to Step S110 and the server 200 executes deciding whether or not to restart the delivery.

After Step S140, the server 200 executes confirming the status of the resident 4 (Step S150) and deciding whether or not to complete the delivery (Step S151). That is, determining whether or not the resident 4 is in the residence 3 and the status of the resident 4 is not fall into either the first category or the second category. When deciding to complete the delivery (Step S151; Yes), the processing proceeds to Step S160. When deciding not to complete the delivery (Step S151; No), the processing returns back to Step S150.

In Step S160, the server 200 executes instructing the moving body 100 to complete the delivery. Then, the processing proceeds to Step S170.

In Step S170, the moving body 100 receives the instruction information for completing the delivery from the server 200. And the moving body 100 performs the process for completing the delivery. After Step S170, the processing ends.

1-6. Effect

As described above, according to the first embodiment, instructing the moving body 100 to start or complete the delivery is executed based on the status of the resident 4. It is thus possible to reduce that the resident 4 is unable to respond for receiving the objects 2 when the objects 2 are delivered by the moving body 100. Accordingly, it is thus possible to reduce sense of annoyance of the resident 4 to receive objects 2.

In the above explanation, the case in which the objects 2 are delivered to the residence 3 is explained, but the home delivery system 10 according to the present embodiment may be suitably applied to the case in which a plurality of objects is respectively delivered to a plurality of residences (e.g., the case in which the plurality of objects is respectively delivered from a pick-up location of housing complex to each house of the housing complex).

For example, the server 200 executes observing the status of resident 4 of each of the plurality of residences. And the server 200 executes deciding whether or not to start the delivery about each of the plurality of residences respectively. Then the server 200 executes instructing the moving body 100 to start the delivery of some objects of which the delivery address is the residence decided to start the delivery. After that, the moving body 100 stores some objects and starts the delivery. When the moving body 100 arrives at either residence, the serve 200 executes confirming the status of resident 4 of the destination residence and instructing the moving body 100 to complete the delivery. When the moving body 100 receives the instruction information for completing the delivery, the moving body 100 performs handing over the objects to the resident 4 of the destination residence. After that, when there are no objects to deliver, delivering by the moving body 100 ends. On the other hand, when there are some objects to deliver, the moving body 100 moves towards either residence. After the moving body 100 arrives at the residence, the moving body 100 stands by for instruction by the server 200. The server 200 repeats the process of completing the deliver.

Furthermore, the home delivery system 10 may include a plurality of moving bodies. In this case, the server 200 may be configured to execute the process for each of the plurality of moving objects in parallel.

1-7. Modified Example

The home delivery system 10 according to the first embodiment may employ a modified embodiment as follows.

1-7-1. First Modified Example

The server 200 may be further configured to execute receiving an input of a setting for determining the detection information to be acquired from the plurality of sensors 310, and storing the setting in the memory 210. And when the server 200 executes acquiring the detection information, the acquiring the detection information may include acquiring the detection information according to the setting.

Figure 7:
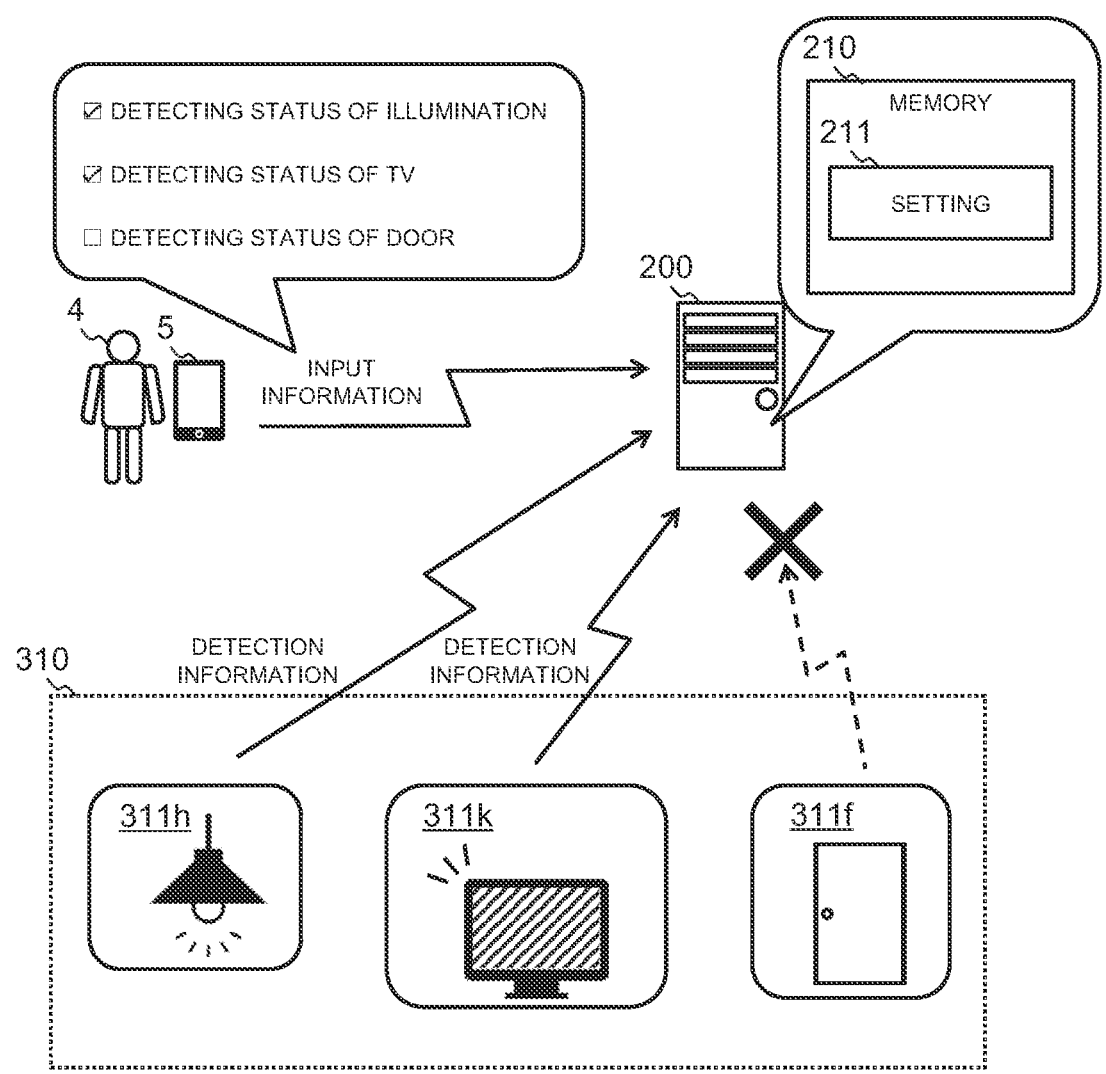
FIG. 7 is a conceptual diagram for explaining an example of a setting for determining detection information to be acquired from the plurality of sensors.

FIG. 7 is a conceptual diagram for explaining an example of the setting 211. In the example shown in FIG. 7, the resident 4 transmits the input of the setting 211 to the server 200 through the user device 5 which the resident 4 possesses. The user device 5 is, for example, a computing platform device (e.g., smartphone) with a specific application installed. However, the user device 5 may be a dedicated device for transmitting the input of the setting 211 to the server 200. The input of the setting 211 includes information of whether or not to enable the detection by the respective sensor 311 of the plurality of sensors 310. In the example shown in FIG. 7, the input of the setting 211 includes information in which "detecting the status of the illumination" and "detecting the status of the TV" are enabled but "detecting the status of the door" is not enabled.

The server 200 executes receiving the input of the setting 211 and storing the setting 211 in the memory 210. And the server 200 executes acquiring the detection information according to the setting 211. That is, the example shown in FIG. 7, the server 200 acquires the detection information from the sensor 311h and the sensor 311k, but does not acquire the detection information form the sensor 311f.

Incidentally, the setting 211 may not specify the respective sensor 311. For example, the plurality of sensors 310 may be classified according to a particular criterion, and the setting 211 may be given regarding to each classification of the plurality of the sensors 310. For example, the plurality of sensors 310 is classified according to the level of personal information for the detection information, and the setting 211 is given to specify the level of personal information.

Figure 8:
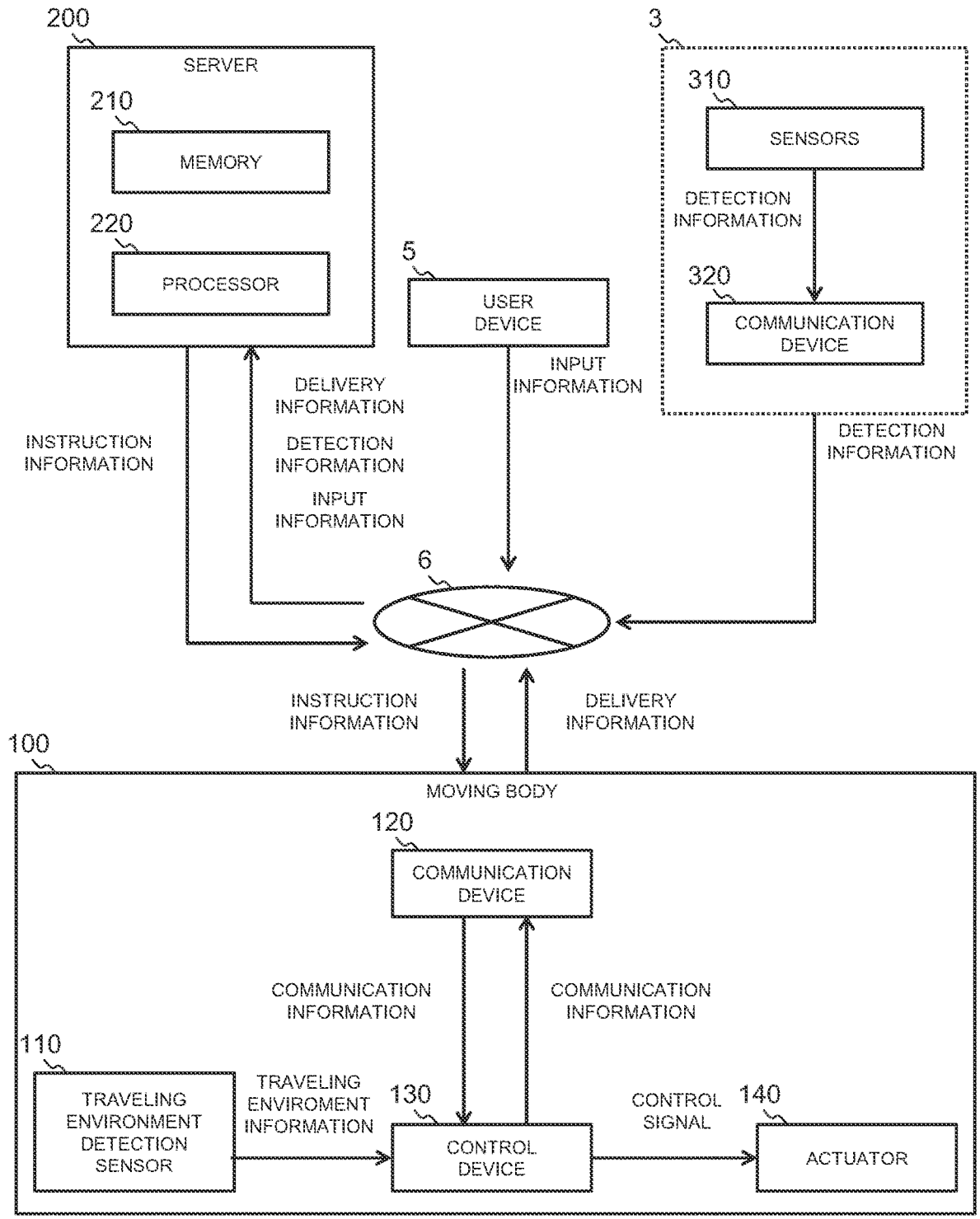
FIG. 8 is a block diagram for explaining a configuration of the home delivery system according to a first modified example of the first embodiment of the present disclosure.

FIG. 8 is a block diagram for explaining a configuration of the home delivery system 10 according to the first modified example. As shown in FIG. 8, the user device 5 is connected to the communication network 6, and transmits the input of the setting 211 to the server 200 through the communication network 6. Then, the server 200 receives the input of the setting 211 through the communication network 6 and stores the setting 211 in the memory 210.

By employing the first modified example, the resident 4 can limit the server 200 acquires the detection information that the resident 4 does not want to be known, it is thus possible to improve privacy protection.

1-7-2. Second Modified Example

The server 200 may be further configured to execute receiving a designation of a receiver for the objects 2. And when the server 200 executes observing the status of the resident 4, the observing the status of the resident 4 may include observing a status of the receiver. In other words, when the receiver for the objects 2 is designated, the status of the resident 4 who is not the receiver may not be considered for deciding to start or complete the delivery.

For example, the server 200 determines whether or not the receiver is designated for the objects 2 based on the delivery information acquired from the moving body 100. Then, the server 200 executes monitoring the status of the receiver out of residents in the residence 3.

Here, specifying the receiver out of the residents in the residence 3 may be performed based on image analysis of the image captured by the camera, authentication information of the wearable device worn by the residents, device information of the user device 5, and the like.

By employing the second modified example, it is possible to reduce the situation that the receiver is unable to respond for receiving the objects 2 when the objects 2 are delivered.

1-7-3. Third Modified Example

The server 200 may be further configured to execute receiving an input of changing either or both of the first category and the second category. A configuration of the home delivery system 10 according to the third modified example may be equivalent to the configuration of the home delivery system 10 according to the first modified example (See FIG. 8). In this case, the resident 4 transmits the input of changing to the server 200 through the user device 5. And the server 200 receives the input of changing, then changes either or both of the first category and the second category in the memory 210 according to the input of changing. Here, the input of changing may include information of the status of the resident 4 as the first category or the second category.

By employing the third modified example, the resident 4 can arbitrarily set the status of the resident 4 as the first category or the second category, it is thus possible to improve convenience of the home delivery system 10.

1-7-4. Fourth Modified Example

When the server 200 executes instructing the moving body 100 to start the delivery, the instructing the moving body 100 to start the delivery may include temporarily shrinking a range of the first category when instructing the moving body 100 to start the delivery is not executed for a predetermined period. Or when the server 200 executes instructing the moving body 100 to complete the delivery, the instructing the moving body 100 to complete the delivery may include temporarily shrinking a range of the first category or the second category when instructing the moving body 100 to complete the delivery is not executed for the predetermined period. Here, the predetermined period may be given in advance as the program.

For example, when the first category is given as shown in Table. 1, and when the instructing the moving body 100 to start the delivery is not executed for a predetermined period, the server 200 executes temporarily shrinking the range of the first category by removing "studying or working at a desk" out of the first category. In this case, even if the status of resident 4 is fall into "studying or working at a desk", the server 200 may execute instructing the moving body 100 to start the delivery. The server may execute temporarily shrinking the range of the first category by changing "studying or working at a desk" to "working at a desk", as an example. Similarly, the server may execute temporarily shrinking the range of the second category.

The shrinking the range of the first category or the second category may be executed in stages. For example, the predetermined period includes a first period and a second period. Here, the second period is longer than the first period. And when the instructing is not executed for the first period, the server 200 executes changing "studying or working at a desk" to "working at a desk" in the first category. Furthermore, when the instructing is not executed for the second period, the server 200 executes removing "working at a desk" out of the first category.

Incidentally, the server 200 may release the temporary shrinking of the range of the first category or the second category after the moving body 100 performs process for completing the delivery.

By employing the fourth modified example, when the instructing is not executed for the predetermined period, it is possible to moderate the condition for instructing to start or complete the delivery. It is thus possible to reduce the situation that the instructing to start or complete the delivery is not performed.

2. Second Embodiment

The following describes the second embodiment. Hereinafter, the matters already explained in the above description will be omitted as appropriate.

In the home delivery system 10 according to the first embodiment, the server 200 executes observing the status of the resident 4 and instruction the moving body 100 to start or complete the delivery. On the other hand, in the home delivery system 10 according to the second embodiment, the moving body 100 executes observing the status of the resident 4 and deciding to start or complete the delivery.

2-1. Configuration of Home Delivery System

Figure 9:
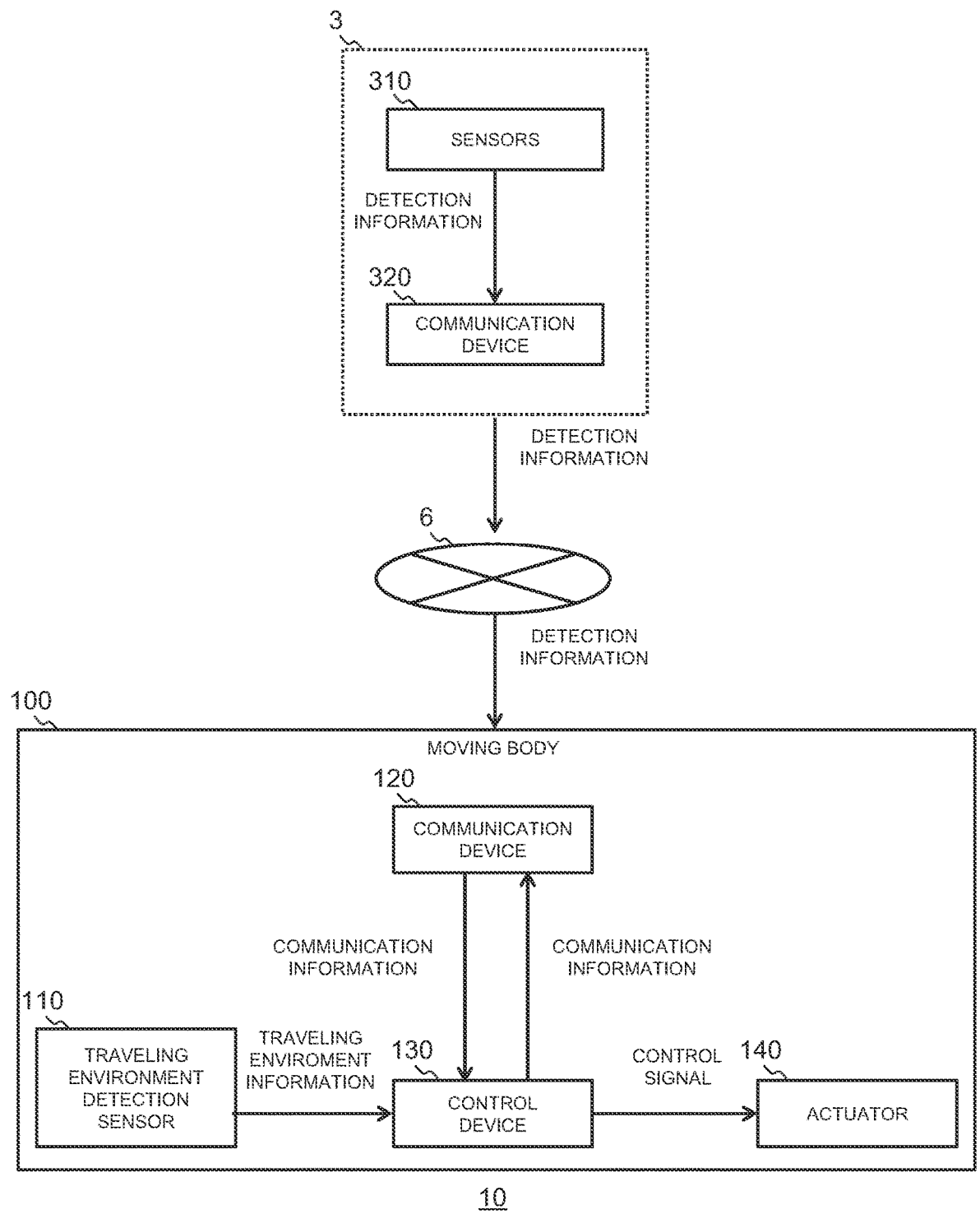
FIG. 9 is a block diagram for explaining a configuration of the home delivery system according to a second embodiment of the present disclosure.

FIG. 9 is a block diagram for explaining a configuration of the home delivery system 10 according to the second embodiment. As shown in FIG. 9, the home delivery system 10 according to the second embodiment does not comprise the server 200 for the first embodiment.

The communication device 320 acquires from the plurality of sensors 310 and transmits the detection information to the moving body 100 through the communication network 6.

The detection information received by the communication device 120 includes at least the detection information transmitted by the communication device 320. And the communication information transmitted to the control device 130 includes at least the detection information transmitted by the communication device 320.

The memory of the control device 130 stores the first category and the second category. And the control device 130 executes observing the status of the resident 4 and deciding to start or complete the delivery. Here, the control device 130 may execute a process equivalent to the process performed by the server 200 according to the first embodiment (See FIG. 5). However, the output of the delivery starting process 222 and the delivery completing process 223 is the control signal. The process may be realized by the program stored in the memory of the control device 130. Alternatively, the process may be realized by a plurality of processing apparatuses. In this case, the control device 130 represents a system composed of the plurality of processing apparatuses.

In the home delivery system 10 according to the second embodiment, the control device 130 executes observing the resident 4 in the residence 3. And the control device 130 executes confirming the status of the resident 4 and deciding to start or complete the delivery. Then, the control device 130 outputs the control signal which have the moving body 100 perform starting or completing the delivery.

2-2. Home Delivery Method

In the home delivery system 10 according to the second embodiment, the equivalent home delivery method as the first embodiment (See FIG. 6) may be realized in the moving body 100. However, with respect to the content described in FIG. 6, the process executed by the server 200 is executed by the control device 130 in the second embodiment. And starting the delivery and completing the delivery performed by the moving body 100 are realized by the control signal outputted from the control device 130.

2-3. Effect

By the moving body 100 and the home delivery method according to the second embodiment, it is possible to achieve the equivalent effect as the first embodiment.

2-4. Modified Example

The moving body 100 according to the second embodiment may employ a modified embodiment as follows. Hereinafter, the matters already explained in the above description will be omitted as appropriate.

2-4-1. First Modified Example

The control device 130 may be further configured to execute receiving the input of the setting for determining the detection information to be acquired from the plurality of sensors 310, and storing the setting in the memory of the control device 130. And when the control device 130 executes acquiring the detection information, the acquiring the detection information may include acquiring the detection information according to the setting.

By employing the first modified example, the resident 4 can limit the control device 130 acquires the detection information that the resident 4 does not want to be known, it is thus possible to improve privacy protection.

2-4-2. Second Modified Example

The control device 130 may be further configured to execute receiving the designation of the receiver for the objects 2. And when the control device 130 executes observing the status of the resident 4, the observing the status of the resident 4 may include observing the status of the receiver. In other words, when the receiver for the objects 2 is designated, the status of the resident 4 who is not the receiver may not be considered for deciding to start or complete the delivery.

By employing the second modified example, it is possible to reduce the situation that the receiver is unable to respond for receiving the objects 2 when the objects 2 are delivered.

2-4-3. Third Modified Example

The control device 130 may be further configured to execute receiving the input of changing either or both of the first category and the second category.

By employing the third modified example, the resident 4 can arbitrarily set the status of the resident 4 as the first category or the second category, it is thus possible to improve convenience of the home delivery system 10.

2-4-4. Fourth Modified Example

When the control device 130 executed deciding to start the delivery, the deciding to start the delivery may include temporarily shrinking the range of the first category when deciding to start the delivery is not executed for the predetermined period. Or when the control device 130 executed deciding to complete the delivery, the deciding to complete the delivery may include temporarily shrinking the range of the first category or the second category when deciding to complete the delivery is not executed for the predetermined period.

By employing the fourth modified example, when the deciding is not executed for the predetermined period, it is possible to moderate the condition for instructing to start or complete the delivery. It is thus possible to reduce the situation that the deciding to start or complete the delivery is not performed.

What is claimed is:

1. A home delivery system delivering objects to a residence, comprising:
   a moving body configured to move autonomously or remotely;
   a plurality of sensors placed in the residence; and a processing apparatus configured to execute:
  storing in a memory;
    a first category of a status of the resident, indicating the resident being unable to respond for a first amount of time, and
    a second category of the status of the resident, indicating the resident being unable to respond for a second amount of time less than the first amount of time;
  acquiring detection information from the plurality of sensors;
  determining whether a resident is in the residence based on the detection information;
  instructing the moving body to start a delivery based on the determination that the resident is in the residence;
  after arriving at the residence, determining one or more activities of the resident based on the detection information;
  determining whether the resident is available to respond to the delivery based on the determined one or more activities of the resident; and
  instructing the moving body to complete the delivery based on the determination the resident is available to respond to the delivery after the moving body arrives at the residence,
wherein the instructing the moving body to start the delivery includes instructing the moving body to start the delivery based upon a determination the resident is in the residence and the status of the resident does not fall into the first category,
wherein the instructing the moving body to complete the delivery includes instructing the moving body to complete the delivery based upon a determination the resident is in the residence and the status of the resident does not fall into either the first category or the second category, and
wherein
  the instructing the moving body to start the delivery includes removing one or more actions that belong to the first category based upon a determination the instructing the moving body to start the delivery is not executed for a first predetermined period, or
  the instructing the moving body to complete the delivery includes removing one or more actions that belong to the first category or the second category based upon a determination the moving body to complete the delivery is not executed for a second predetermined period.

2. The home delivery system according to claim 1, wherein
the processing apparatus is further configured to execute:
  receiving an input of a setting for determining the detection information to be acquired; and
  storing the setting in the memory, and
wherein the acquiring the detection information includes acquiring the detection information according to the setting.

3. The home delivery system according to claim 1, wherein
the processing apparatus is further configured to execute receiving a designation of a receiver for the objects, and
the determining whether the resident is in the residence includes observing a status of the receiver.

4. The home delivery system according to claim 1, wherein
the processing apparatus is further configured to execute receiving an input of changing either or both of the first category and the second category.

5. A moving body for delivering objects to a residence autonomously or remotely, the moving body comprising:
a processing apparatus configured to execute:
  storing in a memory:
    a first category of a status of the resident, indicating the resident being unable to respond for a first amount of time, and
    a second category of the status of the resident, indicating the resident being unable to respond for a second amount of time less than the first amount of time;
  acquiring detection information from a plurality of sensors placed in the residence;
  determining whether a resident is in the residence based on the detection information;
  starting a delivery based on the determination that the resident is in the residence;
  after arriving at the residence, determining one or more activities of the resident based on the detection information;
  determining whether the resident is available to respond to the delivery based on the determined one or more activities of the resident; and
  completing the delivery based on the determination the resident is available to respond to the delivery after the moving body arrives at the residence,
wherein the starting the delivery includes starting the delivery based upon a determination the resident is in the residence and the status of the resident does not fall into the first category,
wherein the completing the delivery includes completing the delivery based upon a determination the resident is in the residence and the status of the resident does not fall into either the first category or the second category, and
wherein
  the starting the delivery includes removing one or more actions that belong to the first category based upon a determination the starting the delivery is not executed for a first predetermined period, or
  the completing the delivery includes removing one or more actions that belong to the first category or the second category based upon a determination the completing the delivery is not executed for a second predetermined period.

6. The moving body according to claim 5, wherein
the processing apparatus is further configured to:
  receiving an input of a setting for determining the detection information to be acquired; and
  storing the setting in the memory, and
wherein the acquiring the detection information includes acquiring the detection information according to the setting.

7. The moving body according to claim 5, wherein
the processing apparatus is further configured to execute receiving a designation of a receiver for the objects, and
the determining whether the resident is in the residence includes observing a status of the receiver.

8. The moving body according to claim 6, wherein
the processing apparatus is further configured to execute receiving an input of changing either or both of the first category and the second category.

9. A home delivery method delivering objects to a residence by a moving body configured to move autonomously or remotely, comprising:
storing in a memory:
a first category of a status of the resident, indicating the resident being unable to respond for a first amount of time, and
a second category of the status of the resident, indicating the resident being unable to respond for a second amount of time less than the first amount of time;
acquiring detection information from a plurality of sensors placed in the residence;
determining whether a resident is in the residence based on the detection information;
instructing the moving body to start a delivery based on at least one condition that the resident is in the residence;
instructing the moving body move to the residence;
after arriving at the residence, determining one or more activities of the resident based on the detection information;
determining whether the resident is available to respond to the delivery based on the determined one or more activities of the resident; and
instructing the moving body to complete the delivery based on the determination the resident is available to respond to the delivery after the moving body arrives at the residence,
wherein the instructing the moving body to start the delivery includes instructing the moving body to start the delivery based upon a determination the resident is in the residence and the status of the resident does not fall into the first category,
wherein the instructing the moving body to complete the delivery includes instructing the moving body to complete the delivery based upon a determination the resident is in the residence and the status of the resident does not fall into either the first category or the second category, and
wherein
the instructing the moving body to start the delivery includes removing one or more actions that belong to the first category based upon a determination the instructing the moving body to start the delivery is not executed for a first predetermined period, or
the instructing the moving body to complete the delivery includes removing one or more actions that belong to the first category or the second category based upon a determination the moving body to complete the delivery is not executed for a second predetermined period.

10. The home delivery method according to claim 9, wherein
based on a receiver for the objects being designated, the determining whether the resident is in the residence includes observing a status of the receiver.

* * * * *